S. J. WHITE.
POTATO PEELER.
APPLICATION FILED JAN. 28, 1919.
1,351,711.
Patented Aug. 31, 1920.
2 SHEETS—SHEET 1.
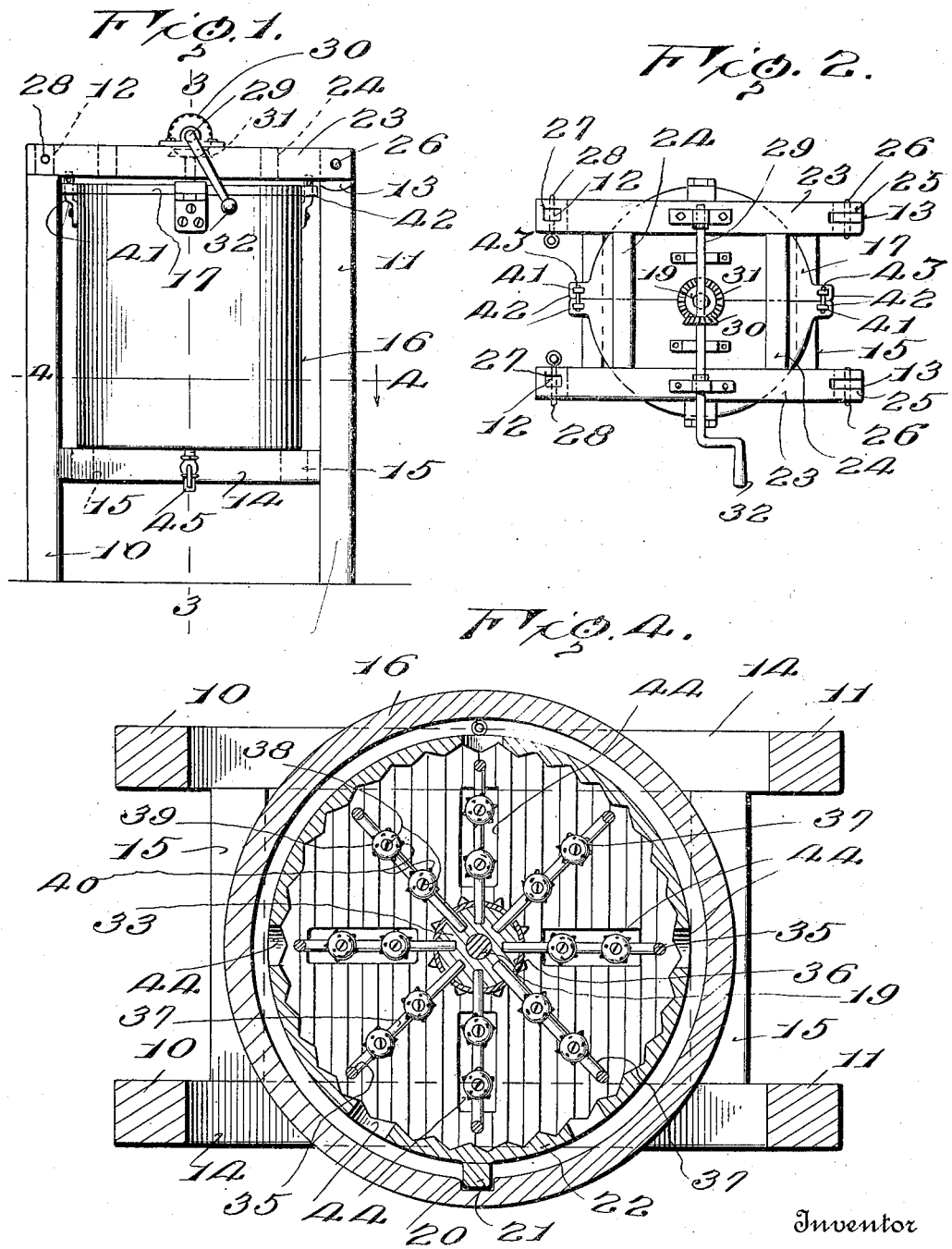
Inventor
S. J. White,
Attorneys S. J. WHITE.
POTATO PEELER.
APPLICATION FILED JAN. 28, 1919.
1,351,711.
Patented Aug. 31, 1920.
2 SHEETS—SHEET 2.
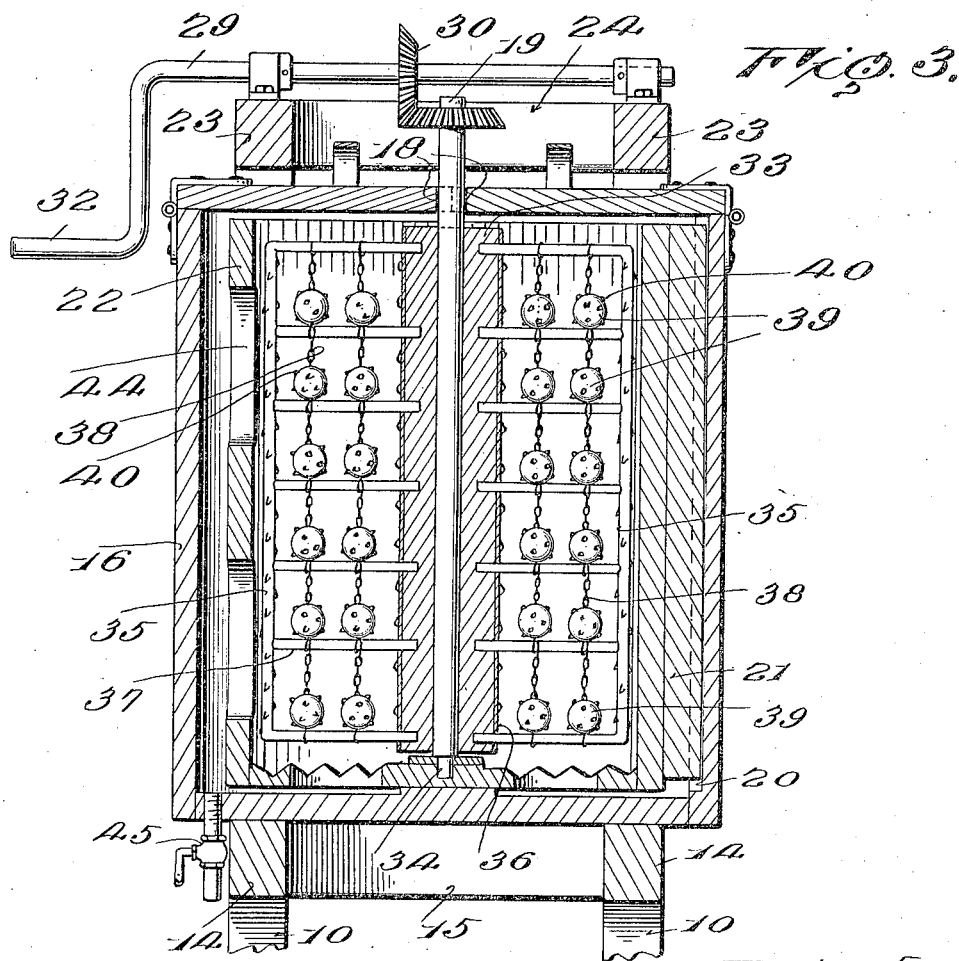
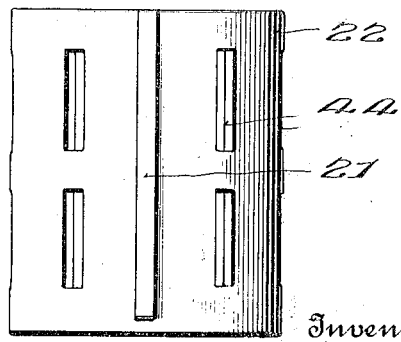
Inventor
S. J. White,
By Chandler & Chandler
Attorneys

UNITED STATES PATENT OFFICE.

SAMUEL JESSIE WHITE, OF HALEYVILLE, ALABAMA.

POTATO-PEELER.

1,351,711.  Specification of Letters Patent.  Patented Aug. 31, 1920.

Application filed January 28, 1919. Serial No. 273,676.

*To all whom it may concern:*

Be it known that I, SAMUEL J. WHITE, a citizen of the United States, residing at Haleyville, in the county of Winston, State of Alabama, have invented certain new and useful Improvements in Potato-Peelers; and I do hereby declare the following to be a full, clear, and exact description of the invention, such as will enable others skilled in the art to which it appertains to make and use the same.

This invention relates to new and useful improvements in vegetable peelers and washers, and particularly to devices for peeling and washing potatoes.

One object of the present invention is to provide a novel and improved structure of this character by means of which a large quantity of potatoes can be efficiently peeled and washed ready for immediate use.

Another object is to provide a novel means for scraping the peelings or skins off of massed articles of diet by means of a flail comprising a staff moved through the mass and a trailing swingle in the form of a ball having teeth which cut said peelings.

Another object is to provide means for operating a number of such flails by mounting their staffs radially in a core and otherwise connecting and supporting the same to produce a dasher adapted for rotation within a receptacle containing the mass of articles being treated.

Other objects and advantages will be apparent from the following description when taken in connection with the accompanying drawing.

In the drawing:

Figure 1 is a front elevation of the improved potato peeling and washing machine.

Fig. 2 is a top plan view of the same.

Fig. 3 is a vertical transverse sectional view taken on the line 3—3 of Fig. 1.

Fig. 4 is a horizontal sectional view taken on the line 4—4 of Fig. 1.

Fig. 5 is an elevation of the scraping drum removed from the tank.

Referring particularly to the accompanying drawings, there is shown a supporting frame which includes the four corner uprights 10 and 11, the former of which have their upper ends formed with the tenons 12 while the latter have their upper ends formed with the reduced portions 13. Connecting these uprights, to complete the rectangular frame, are the horizontal spacing and bracing bars 14. Transverse members 15 are connected to the uprights to provide a seat on which the water tank 16 is disposed. This tank is provided with a cover which includes the two half-sections 17, hinged to the upper edge of the tank and each having a semi-circular recess in the center of its straight edge, as shown at 18, for coöperation with the recess of the other section to form a circular opening for the reception of the dasher shaft 19. In one portion of the vertical wall of the tank there is formed a vertical groove 20 for the reception of the vertical rib 21, formed on the outer face of the receptacle 22, which is removably disposed in the tank and has a step bearing 34 in its bottom for the lower end of said shaft.

A frame consisting of the parallel side members 23 and the transverse connecting members 24, has the bifurcations 25 in corresponding ends for reception of the reduced ends 13 of the uprights 11, and receive pivot bolts or pins 26 therethrough. The other ends of the members 23 are formed with mortises 27 for the reception of the tenons 12 of the uprights 10, and the reception of transverse pins 28, whereby the frame is hingedly carried by the main frame, and detachably held in lowered position, over the tank. Supported on this upper frame is a transverse shaft 29 which has a beveled pinion 30 on its intermediate portion for meshing engagement with the beveled pinion 31 on the upper end of the dasher shaft 19, and a crank handle 32 on one end for manual rotation thereof.

The dasher comprises a core 33 fast on the shaft, and a number of radial skeleton frames or grids whereof each consists of an upright rod 35 having its ends bent inward in arms entering the core, and other arms 37 connecting the rod and core, all arms being spaced a sufficient distance to permit the passage between them of the largest potatoes. This dasher is provided with means for peeling said potatoes. Its core has a metallic facing 36 which is roughened in any suitable manner as shown, and the rods are also roughened. Suspended from all arms but the lowermost are short chains 38, and hanging from these chains are metallic balls 39 having their surfaces roughened as by being formed with struck-up pointed teeth or tangs 40. The wall and bottom of the receptacle 22 are corrugated or otherwise roughened, as shown.

Extending upwardly and outwardly from diametrically opposite sides of the upper portion of the tank are apertured lugs which, when the sections of the cover of the tank are in closed position, are disposed between apertured lugs 42, carried by the abutting inner end portions of the said sections, the first named lugs being shown at 41. Removable pins 43 are passed through the lugs 41 and 42, whereby the cover sections will be held in closed position. In the sides of the receptacle 22, as well as in the bottom thereof, there are formed elongated openings 44 for the passage of water, from the tank, into the said receptacle, in the latter of which the potatoes to be peeled are placed.

It will thus be seen that when the crank handle is turned the dasher will be rotated with the result that the potatoes will be thrown around within the receptacle 22 and the skins effectively removed by the roughened surfaces of the receptacle, the grids, and the balls. As each grid moves through the mass of potatoes, such of the latter as are traveling with the grids are scraped by the interior of the receptacle. But mostly the arms will pass through the mass of potatoes, dragging the chains and balls behind them, and as the balls are thus drawn through the mass their teeth 40 scrape off the skins and peel the potatoes. The tendency of each ball is to follow directly behind the point at which its chain is connected with the arm which carries it, but when a large potato is encountered it is possible for a ball to swing aside a little and pass around it, and therefore the flexible support by means of which each scraping ball is connected with and moved by its arm permits the ball to trail behind said arm and yet to yield a little when an obstruction is encountered. Each arm is in effect the equivalent of the staff of a war-flail, and the chain and ball the equivalent of the swingle thereof; but as used in this machine the flail is dragged through the mass of potatoes or other articles of diet, rather than being so mounted and moved that its swingle is employed to beat or bruise the articles.

After the skins have been removed, water may be drawn from the tank through the drain cock 45, and the peeling mechanism is then removed from the tank, and the potatoes washed, either in the tank or by pouring them into another receptacle and washing them therein.

What is claimed is:

1. In a device for peeling potatoes or like articles, the combination with a receptacle for containing a mass of the articles; of a flail consisting of a staff and a swingle flexibly connected therewith and having a roughened surface, and means for moving the staff through the mass and permitting the swingle to trail from it.

2. In a device for peeling potatoes or like articles, the combination with a receptacle for containing a mass of the articles; of a grid including a plurality of spaced arms, chains connected at one end to the arms, and balls connected to the other ends of the chains and having roughened surfaces, and means for moving the grid and the elements carried thereby through the mass of articles.

3. A potato peeler comprising a receptacle, a dasher mounted for rotation therein and consisting of a core and a plurality of grids carried thereby, elements having roughened surfaces for action on the potatoes, and flexible connections between the arms of the grid and said elements whereby the latter trail behind the arms as the dasher is rotated.

4. In a potato peeler, the combination with a receptacle having its inner face roughened, a step bearing at the center of its bottom, a cover having a bearing, and driving mechanism above the cover; of a dasher within said receptacle comprising a shaft mounted in said bearings and operatively connected at its upper end with said driving mechanism, a core fast on the shaft, a plurality of skeleton grids projecting radially from the core and each having an upright roughened rod movable adjacent the wall of the receptacle and arms connecting the rod with the core, a roughened facing on the latter, and a series of chains connected with and trailed by said arms as the dasher is rotated, each chain having at its rear end an enlarged element with a roughened face.

In testimony whereof, I affix my signature, in the presence of two witnesses.

SAMUEL JESSIE WHITE.

Witnesses:
D. S. GARRISON,
JESS. HARRIS.